Sept. 12, 1961  L. H. MORIN  2,999,276
METHOD OF MOLDING PLASTIC TRAVELERS WITH WIRE INSERTS
Filed Sept. 11, 1957  2 Sheets-Sheet 1

INVENTOR
LOUIS H. MORIN
BY
Howard E. Thompson
ATTORNEY

Sept. 12, 1961  L. H. MORIN  2,999,276
METHOD OF MOLDING PLASTIC TRAVELERS WITH WIRE INSERTS
Filed Sept. 11, 1957  2 Sheets-Sheet 2

INVENTOR.
LOUIS H. MORIN
BY
Howard T. Thompson
ATTORNEY

United States Patent Office 2,999,276
Patented Sept. 12, 1961

2,999,276
METHOD OF MOLDING PLASTIC TRAVELERS WITH WIRE INSERTS
Louis H. Morin, Bronx, N.Y., assignor to Coats & Clark Inc., New York, N.Y., a corporation of Delaware
Filed Sept. 11, 1957, Ser. No. 683,253
1 Claim. (Cl. 18—59)

This invention relates to travelers formed from cast or molded plastic material. More particularly, the invention deals with travelers of this type and kind employing inserts of hard wearing material having exposed portions for engagement with the thread in movement of the travelers over the traveler ring.

Still more particularly, the invention deals with a novel method of producing travelers of the character described, wherein the insert is fashioned to establish anchorage within the cast or molded portion of the traveler.

The novel features of the invention will be best understood from the following description, when taken together with the accompanying drawing, in which certain embodiments of the invention are disclosed and, in which, the separate parts are designated by suitable reference characters in each of the views and, in which.

Figure 8:
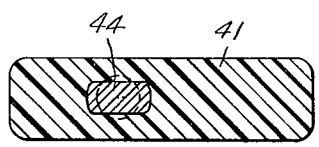
Figure 7:
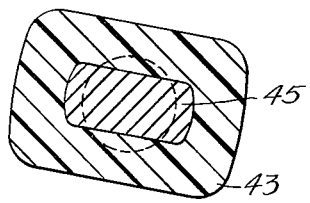
Figure 5:
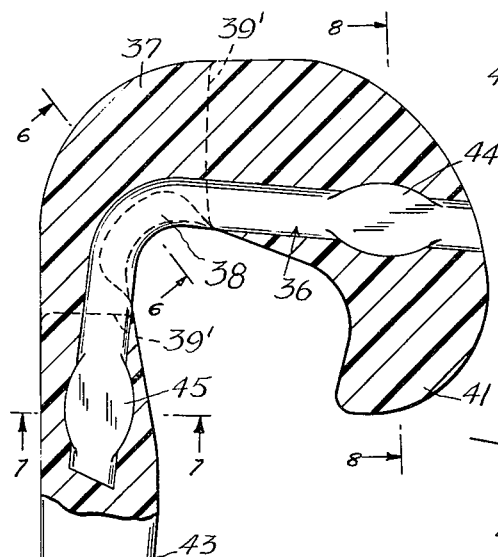
FIG. 5 is an enlarged side and sectional detail view of another form of traveler showing a modified form of insert formed therein.
Figure 9:
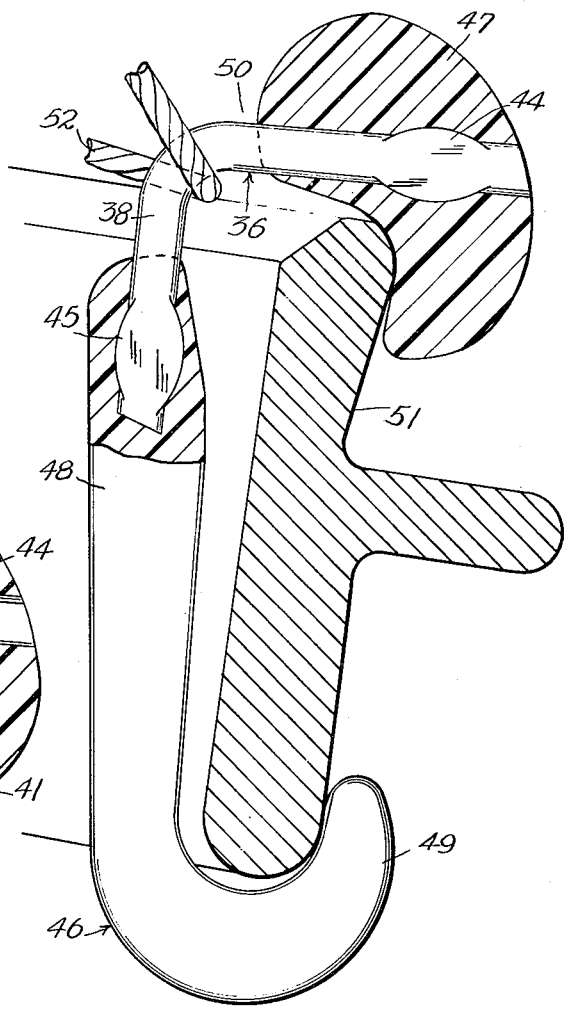
Figure 6:
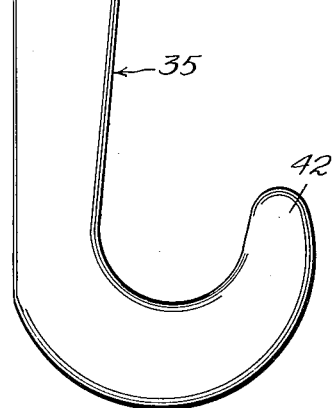

FIG. 6 is a section on the line 6—6 of FIG. 5.
FIG. 7 is a section on the line 7—7 of FIG. 5.
FIG. 8 is a section on the line 8—8 of FIG. 5; and
FIG. 9 is a view similar to FIG. 5 showing another modification and indicating, in part, the mounting of a traveler on a traveler ring, a portion of the ring being shown in section.

To illustrate one adaptation and use of the method of producing traveler rings, as hereinafter more specifically defined, I have illustrated in FIGS. 1, 2 and 3 of the drawing diagrammatically the steps of first forming a workpiece to produce an insert, then forming a cast or molded traveler on the insert positioned within and between a pair of relatively movable dies and, in this diagrammatic showing, 10 represents a forming station, comprising a pair of relatively movable forming dies 11 and 12, having suitably formed impressions 13 on adjacent surfaces thereof to shape a rod-like workpiece 14 fed into position between the dies or forming tools 11 and 12. This operation takes place adjacent a casting or molded station 15 employing a pair of dies, the surface of one of which is indicated at 16 in FIG. 1. An outline of the cavity of the die is noted in dotted lines at 17 in FIG. 2 of the drawing and, in part, at 18 in FIG. 3 of the drawing.

The contour of the cavity 17 is such as to form a double hooked traveler 19, preferably of cast or molded plastic material, the traveler having a large hook end 20 and a smaller hook end 21, the hook ends being joined by a relatively long shank 22.

Figure 1:
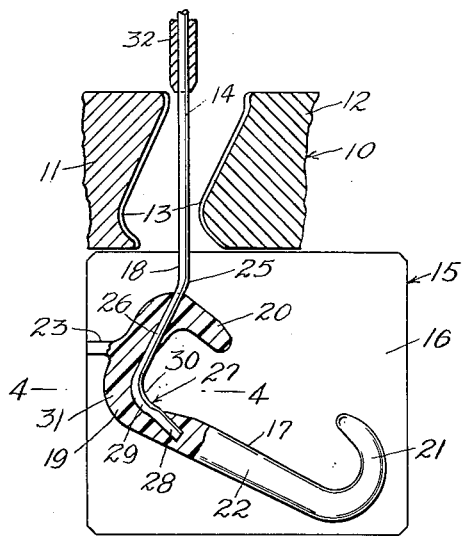
FIG. 1 is a diagrammatic sectional and face view illustrating the formation of a traveler upon a fashioned end portion of a wire or other strand.
Figure 2:
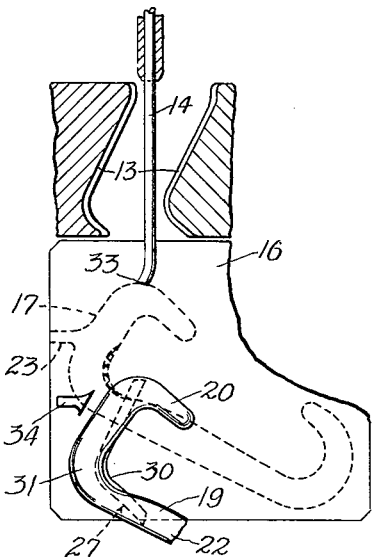
FIG. 2 is a view similar to FIG. 1, outlining in dotted lines the die cavity and diagrammatically illustrating the result of a trimming operation in producing the resulting end portion.

Considering FIGS. 1 and 2 of the drawing, it will appear that the die includes a sprue or gate passage 23, which opens into the cavity 17, as does the cavity portion 18 which receives the upper bent portion 25 of the formed workpiece. This bent portion 25 forms a long straight part 26 on the insert 27, the straight portion 26 joining a short angularly offset end 28 in a rounded portion 29, part of the surface of which is exposed, as seen at 30, note FIG. 4, at the inner surface of the rounded part 31 of the hook end 20, in other words, the portion which joins the hook end with the shank 22. This exposed surface 30 forms a hardened bearing surface, upon which the thread operates in the use of the traveler, as will be apparent from the diagrammatic illustration in FIG. 9 of the drawing.

Figure 4:
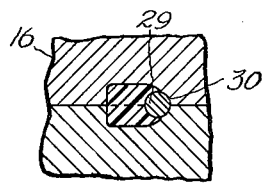
FIG. 4 is a partial section on the line 4—4 of FIG. 1 on an enlarged scale.

As may be seen from FIGS. 1, 2 and 4, the formed workpiece is supported within the closed dies by a cavity portion 18 which clamps the upper bent portion 25. The workpiece may be regarded as held in cantilever-fashion, with the part within the die held in position only through the stiffness of the workpiece material. As is well known, plastic material is injected into dies under considerable pressure. There is risk that the pressure forces will distort a workpiece projecting into the dies in cantilever-fashion. To prevent this, the sprue 23 is located relative to the workpiece so that the entering plastic forces exposed surface 30 against support portions of the dies, thus positively locating the workpiece. As seen in FIG. 4 the workpiece is forced to the right against the support portions. In addition, the forces exerted by plastic flowing past the insert into shank 22 and smaller hook end 21 tend to push offset end 28 to the right in FIG. 1, thus keeping it in place.

Figure 3:
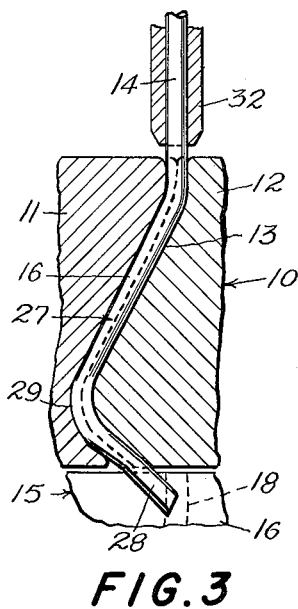
FIG. 3 is an enlarged sectional view of the insert forming tools shown in operative position and indicating part of the die with part of the cavity illustrated in dotted lines.

It will appear from a consideration of FIG. 3 of the drawing that, in shaping the workpiece, the rounded portion 29 formed therein automatically extends the end 28 to the offset relationship, diagrammatically shown, to be positioned within that part of the shank 22 adjacent the hook end 20. This contour of the resulting insert 27 definitely maintains the insert in predetermined position within the traveler.

The method of producing travelers of the type and kind above described will be readily understood from the diagrammatic showings and the following description.

The workpiece strand 14 is fed from a source of supply, preferably through straightening rollers, all of which are omitted, as they are well known in the art and form no specific part of the present invention. This feed of the workpiece is guided by a tubular guide 32 positioned adjacent the dies or tools 11 and 12.

When properly positioned between these tools, the tools are operated to fashion the workpiece in the manner diagrammatically seen in FIG. 3 of the drawing; whereupon, the forming tools 11 and 12 are separated and the workpiece is fed downwardly to position the formed workpieces in the cavity 17 of the dies at the casting station 15 and also in position to register with the cavity 18. The dies of the casting station 15 are then closed and heated plastic material is pressure injected into the cavity 17 through the sprue 23 to form the plastic traveler around the insert portion 27 of the workpiece; whereupon, the dies are separated and suitable trimming tools, at a trimming station not shown, trim the product thus formed to sever the workpiece at the outer surface of the hook 20, as at 33 in FIG. 2 of the drawing, and also to sever the gate portion 34 from the cast or molded traveler, as diagrammatically illustrated in FIG. 2 of the drawing.

This frees the traveler and severed gate portion 34 for discharge into suitable receptacles; whereupon, the above cycle of operation is repeated, the workpiece fashioned, as seen in FIG. 3, then fed into the casting station in formation of the next successive cast traveler. It will be understood, in this connection, that the operations of the forming tools 11 and 12 take place with the dies of the casting station 15 in open position.

In FIGS. 5 to 8, inclusive, I have shown at 35 a modified form of traveler, primarily from the standpoint of the shape and contour of the insert 36 therein, as well as the arrangement of the rounded portion 37 of the traveler with respect to the rounded and more or less central portion 38 of the insert 36. In this connection, it will be noted, from a consideration of FIG. 6 of the drawing, that the portion 37 has flattened sides, as at 39, so as to expose the side portions 40 of the rounded portion 38 beyond the sides 39; thus eliminating the possiblity of the wear of the thread upon the portion 37 or the surfaces 39 thereof.

The reduction of the rounded portion 37 to form the flattened sides 39 takes place between the spaced dotted lines 39', noted in FIG. 5. The traveler 35 has a large hook end 41 and a smaller hook end 42, these ends being joined by a shank 43.

It will appear that the offset ends of the insert include flattened portions, one of which is shown at 44 and positioned within the hook end 41 and the other at 45 and positioned within the shank 43. These flattened end portions serve to definitely position and anchor the insert within the resulting cast or molded traveler 35. The method of procedure in forming the traveler 35 will be generally the same as that diagrammatically illustrated in FIGS. 1, 2 and 3 of the drawing, with the exception that the forming tools, as at 11 and 12, will be fashioned to shape the insert in accordance with the illustration in FIG. 5. The flattened portions 44 and 45 are shown in sectional detail in FIGS. 8 and 7, respectively.

In FIG. 9 of the drawing, I have shown a slight modification of the structure shown in FIG. 5, wherein the traveler 46 is fashioned to form a large hook portion 47 spaced from the shank 48, which integrally joins with the small hook portion 49, as indicated by the space 50.

In other words, what has been done is to remove substantially that part of the traveler 35 positioned between the dotted lines 39' of FIG. 5 of the drawing. This is accomplished by simply fashioning the dies to form spaced cavities, which are bridged by the rounded portion 38 of an insert 36' identical with the insert 36 of FIG. 5 of the drawing, this insert having the flattened portions 44 and 45, respectively, anchored in the hook portion 47 and the end portion of the shank 48, as shown.

In FIG. 9 of the drawing, for illustrative purposes, I have shown a section through a traveler ring 51 to generally illustrate usage of travelers, such as shown in the several figures, and also, in this figure, I have indicated, in part at 52, a thread engaging the rounded portion 38 which, as with the similar portion 30, will provide the hard surface material to take the wear to which travelers of this type and kind are subjected.

It will be apparent, from a consideration of FIGS. 1, 2 and 3 of the drawing, that, in initially shaping the workpiece, as illustrated in FIG. 3, the upper end of the workpiece is offset and this offset forms the offset 28, which extends beyond the surfaces of the tools so that, when the rounded portion 29 is formed, the offset 28 will extend itself to a position to lie within the shank 22. Considering, in this connection, FIG. 2 of the drawing, it will appear that, after the trimming operation at 33, the slight bend still appears in the remaining part of the workpiece and this bend is extended to the position of FIG. 3 when the rounded portion 29 is formed. In this connection, it will be understood that the showings in the drawings are somewhat diagrammatic.

It will be apparent that, at all times, the insert or a part of the surface thereof is exposed at the inner surface of the large hook end of the resulting traveler and, in FIG. 9, the rounded portion of the insert may be said to define a bridging portion, which joins and spaces the large hook end 47 with the shank 48.

Having fully described my invention, what I claim as new and desire to secure by Letters Patent is:

The method of forming a plastic traveler having an insert comprising the steps of positioning a portion of a workpiece strand between a pair of forming dies; closing the forming dies on the workpiece strand and thereby forming a portion of the workpiece strand adjacent an end thereof into an upper portion and an insert, said insert having a bearing surface spaced from the ends of said insert; opening the forming dies and freeing the insert therefrom; positioning the insert while still attached to the workpiece strand within a die cavity formed by a plurality of relatively movable casting dies by clamping the upper portion immovably between relatively movable portions of the casting dies, the insert extending into the die cavity in cantilever fashion with a free end and with the bearing surface contacting a support surface on a die and with the insert free to flex away from the support surface; injecting liquid plastic material under pressure into the die cavity through a sprue opening; directing the pressure of the entering plastic material against the insert to force the bearing surface into firm contact with the support surface during the injecting step whereby the bearing surface is shielded from contact with the liquid plastic; and directing the liquid plastic flow adjacent the free end of the insert substantially along the insert toward and past the free end to prevent lifting of the free end by the plastic and consequent disengagement of the bearing surface from the supporting surface; hardening the liquid plastic material to form a traveler; opening the casting dies; severing the insert from the upper portion; and forming the upper portion and the adjacent portions of the workpiece strand into an insert between the forming dies preparatory to the formation of another traveler.

References Cited in the file of this patent

UNITED STATES PATENTS

| | | |
|---|---|---|
| 665,989 | Bechtold | Jan. 15, 1901 |
| 1,031,467 | Pollitz | July 2, 1912 |
| 1,626,118 | Olin et al. | Apr. 26, 1927 |
| 2,256,769 | Amrine | Sept. 23, 1941 |
| 2,438,348 | Morin | Mar. 23, 1948 |
| 2,636,923 | Perxel | Apr. 28, 1953 |
| 2,683,346 | Pieper | July 13, 1954 |
| 2,749,698 | Stahli | June 12, 1956 |
| 2,758,183 | Canegallo | Aug. 7, 1956 |
| 2,763,032 | Fay | Sept. 18, 1956 |
| 2,821,764 | Leahy et al. | Feb. 4, 1958 |
| 2,934,792 | Harrington | May 3, 1960 |